US009331462B2

(12) United States Patent
Kaneko et al.

(10) Patent No.: US 9,331,462 B2
(45) Date of Patent: May 3, 2016

(54) JUNCTION BOX

(71) Applicant: Yazaki Corporation, Tokyo (JP)

(72) Inventors: Nobutaka Kaneko, Makinohara (JP); Hiroki Tashiro, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/321,082

(22) Filed: Jul. 1, 2014

(65) Prior Publication Data

US 2014/0312031 A1 Oct. 23, 2014

Related U.S. Application Data

(63) Continuation of application No. PCT/JP2013/050864, filed on Jan. 10, 2013.

(30) Foreign Application Priority Data

Jan. 13, 2012 (JP) .................................. 2012-004930

(51) Int. Cl.
*H02G 3/08* (2006.01)
*B60R 16/023* (2006.01)

(52) U.S. Cl.
CPC ............ *H02G 3/081* (2013.01); *B60R 16/0238* (2013.01)

(58) Field of Classification Search
CPC ........... B60R 16/0238; B60R 16/0239; H02G 3/081; H02G 3/088
USPC ............... 220/3.8, 3.2, 3.92, 3.94, 4.02, 4.26, 220/661, 672, 676; 174/520, 17.06, 564, 174/50; 439/76.2; 361/657
See application file for complete search history.

(56) References Cited

U.S. PATENT DOCUMENTS

| 2001/0003069 A1 | 6/2001 | Sekido et al. |
| 2007/0076383 A1 | 4/2007 | Sasaki et al. |
| 2007/0123114 A1 | 5/2007 | Egawa et al. |

(Continued)

FOREIGN PATENT DOCUMENTS

| CN | 1929226 A | 3/2007 |
| CN | 101888077 A | 11/2010 |

(Continued)

OTHER PUBLICATIONS

International Preliminary Report on Patentability issued by the International Searching Authority in counterpart International Application No. PCT/JP2013/050864.

(Continued)

*Primary Examiner* — Fenn Mathew
*Assistant Examiner* — Don M Anderson
(74) *Attorney, Agent, or Firm* — Sughrue Mion, PLLC

(57) ABSTRACT

A junction box includes a box body that has a component mounting portion, an upper cover that covers an upper part of the box body, and a side cover that is attached to a side face of the box body. The box body has a side wall portion which surrounds a component mounting portion and an electric distribution portion which is electrically connected to the component mounting portion. The upper cover has a top panel and a down wall portion which are downwardly provided from the peripheral end of the top panel. The side cover has a terminal and a case portion which covers the terminal. A recess or a hole which is located outside the down wall portion of the upper cover is formed on an upper face of the case portion.

3 Claims, 4 Drawing Sheets

(56) References Cited

U.S. PATENT DOCUMENTS

| | | | |
|---|---|---|---|
| 2008/0110662 A1* | 5/2008 | Akahori et al. ................. | 174/59 |
| 2008/0139018 A1 | 6/2008 | Egawa et al. | |
| 2008/0149387 A1 | 6/2008 | Oda | |
| 2010/0288757 A1* | 11/2010 | Akahori ......................... | 220/3.7 |
| 2014/0311793 A1* | 10/2014 | Kaneko et al. ................ | 174/560 |

FOREIGN PATENT DOCUMENTS

| | | |
|---|---|---|
| EP | 1107278 A2 | 6/2001 |
| JP | H06-310198 A | 11/1994 |
| JP | H06-084730 U | 12/1994 |
| JP | 2004-236449 A | 8/2004 |
| JP | 2007-137389 A | 6/2007 |
| JP | 2008-154412 A | 7/2008 |

OTHER PUBLICATIONS

International Search Report dated Apr. 24, 2013, issued by the International Searching Authority in counterpart International Application No. PCT/JP2013/050864.

Written Opinion dated Apr. 24, 2013, issued by the International Searching Authority in counterpart International Application No. PCT/JP2013/050864.

Communication from the Japanese Patent Office dated Sep. 29, 2015 in a counterpart Japanese application No. 2012-004930.

Communication from the State Intellectual Property Office of P.R. China dated Sep. 7, 2015 in a counterpart Chinese application No. 201380005306.X.

* cited by examiner

JUNCTION BOX

CROSS REFERENCE TO RELATED APPLICATIONS

This application is a continuation of PCT application No. PCT/JP2013/050864, which was filed on Jan. 10, 2013 based on Japanese Patent Application (No. JP-2012-004930) filed on Jan. 13, 2012, the contents of which are incorporated herein by reference.

BACKGROUND OF THE INVENTION

1. Field of the Invention

The present disclosure relates to a junction box mounted on a vehicle, and particularly to a junction box which includes a side cover attached to a body case.

2. Description of the Related Art

A junction box mounted on a vehicle has various structures depending on the type of the vehicle, but usually has structures including, for example, a box body in which electronic components are mounted (body case), an upper cover which covers the upper part of the box body, a lower cover which covers the lower part of the box body, and a side cover which is attached to a side face of the box body (for example, refer to JP-A-2008-154412 and JP-A-2004-236449).

Inside the box body, a component mounting portion where various electronic components such as a large number of fuses or relays are mounted, an electric distribution portion which is connected to power source lines from an external battery or electric wires that are connected to other devices, and internal circuits such as a bus bar or the like which connects the component mounting portion and the electric distribution portion are provided. The electric distribution portion is provided with bolts or the like which are connected to the bus bar.

The side cover has connection terminals such as bus bars that are connected to the power source lines from the battery and the electric wires that are connected to other devices, and a case such as a terminal cover which accommodates these connection terminals, and while the power source lines and the electric wires are extended from the case, the connection terminals are connected to the electric distribution portion of the box body. The side cover is attached when the case of the side cover is locked onto the side face of the box body, and the upper cover is attached by covering the upper edges of the case. Since the upper cover covers the upper edges of the case in this way, it can be prevented that water leaks inside the side cover.

SUMMARY OF THE INVENTION

However, in the traditional junction box described in JP-A-2008-154412 and JP-A-2004-236449, only with the upper cover which covers the upper edges of the case of the side cover, water cannot be sufficiently prevented from leaking inside, and there is a possibility that water which splashes in the engine room may enter into the box body from a gap between the box body and the upper cover. In particular, since the electric distribution portion connected to the high-voltage power source lines or the like is located at a part where the side cover is attached, it is not preferable that the water which leaks from the part of the side cover reaches the electric distribution portion.

Therefore, the present disclosure is intended to provide a junction box which can prevent water from leaking into the electric distribution portion located inside the box body.

In order to achieve the above object, according to the present disclosure, there is provided a junction box comprising:

a box body that has a component mounting portion for mounting an electric component;

an upper cover that covers an upper part of the box body; and a side cover that is attached to a side face of the box body, wherein the box body has a side wall portion which surrounds the component mounting portion and an electric distribution portion which is electrically connected to the component mounting portion;

wherein the upper cover has a top panel and a down wall portion which are downwardly provided from the peripheral end of the top panel;

wherein the side cover has a terminal connected to the electric distribution portion and a case portion which covers the terminal; and wherein a recess or a hole which is located outside the down wall portion of the upper cover is formed on an upper face of the case portion.

For example, the side cover has an opening portion which opens at an outer side face portion of the side cover and a drain path which communicates the recess or the hole with the opening portion.

For example, a water stop projecting portion which is overlapped on the outside of the side wall portion of the box body is formed on the upper cover continuously along a lower edge of the down wall portion, the side cover has a vertical wall which is raised from the upper face of the side cover, and the water stop projecting portion is provided so as to overlap the vertical wall from the outside of the vertical wall, and the recess or the hole in the side cover is provided to be farther outwards than the vertical wall.

For example, a flat face portion located farther outward than the recess or the hole is formed on the upper face of the side cover, the side cover has an attachment portion which is configured to attach to the box body while sliding downward from above along the side wall portion of the box body by receiving pressing power at the flat face portion.

According to the present disclosure described above, because the recess or the hole formed on the upper face of the side cover is provided outside the down wall portion of the upper cover, that is, the position near the down wall portion among the upper face of the side cover is not formed to be flat, water splash that occurs on a flat surface can be prevented, and water can be prevented from leaking from below the down wall portion of the upper cover. Therefore, water can be inhibited from leaking from the gap between the side cover and the upper cover, and water can be prevented from leaking into the electric distribution portion connected to the terminal of the side cover.

According to the present disclosure described above, because the recess or the hole and the opening portion are communicated by the drain path, the water which enters into the recess or the hole can be drained from the opening portion through the drain path to the outside.

According to the present disclosure described above, since the water stop projecting portion which is formed along the bottom edge of the down wall portion of the upper cover is overlapped on the outside of the vertical wall of the side cover, the upper edge of the side cover can be covered with the water stop projecting portion and water can be prevented from leaking into the box body from position of the side cover by the water stop projecting portion. Since the recess and the hole is provided farther outwards than the vertical wall, water can be inhibited from splashing by the recess or the hole.

According to the present disclosure described above, because the side cover is slid to be attached to the box body by pressing the flat face portion, the attaching operation of the side cover can be performed easily by applying a pressing force to the flat face portion. Even if a water splash occurs on such a flat face portion, because the flat face portion is located farther outwards than the recess or the hole, and is provided apart from the down wall portion of the upper cover, the water which splashes on the flat face portion is hard to arrive at the upper cover, and the water can be prevent from leaking into the box main body as described before.

DETAILED DESCRIPTION OF THE EXEMPLARY EMBODIMENTS

Next, a junction box according to one embodiment of the invention is described based on FIGS. 1 to 6. A junction box 1 according to the present embodiment is mounted on a vehicle as a mobile object, and supplies power and transmits signals to electronic devices mounted on the vehicle. In the present disclosure, a junction block (also called a junction box), a fuse block (also called a fuse box), and a relay block (also called a relay box) are collectively referred to as a junction box below.

Figure 1:
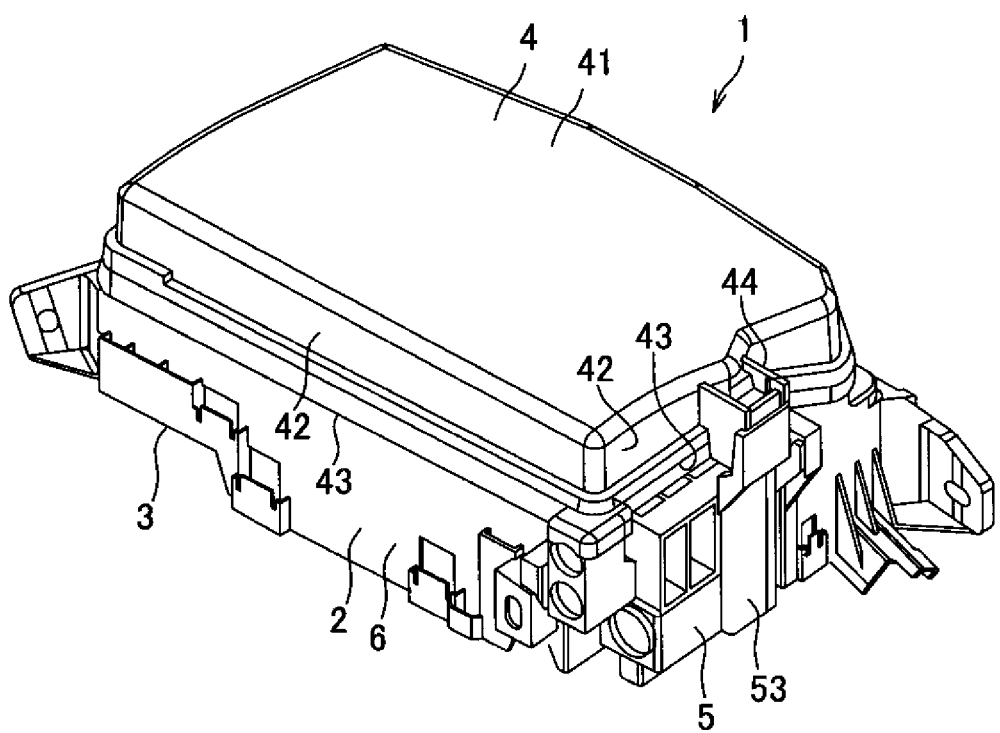
FIG. 1 is a perspective view illustrating a junction box according to one embodiment of the present disclosure.
Figure 2:
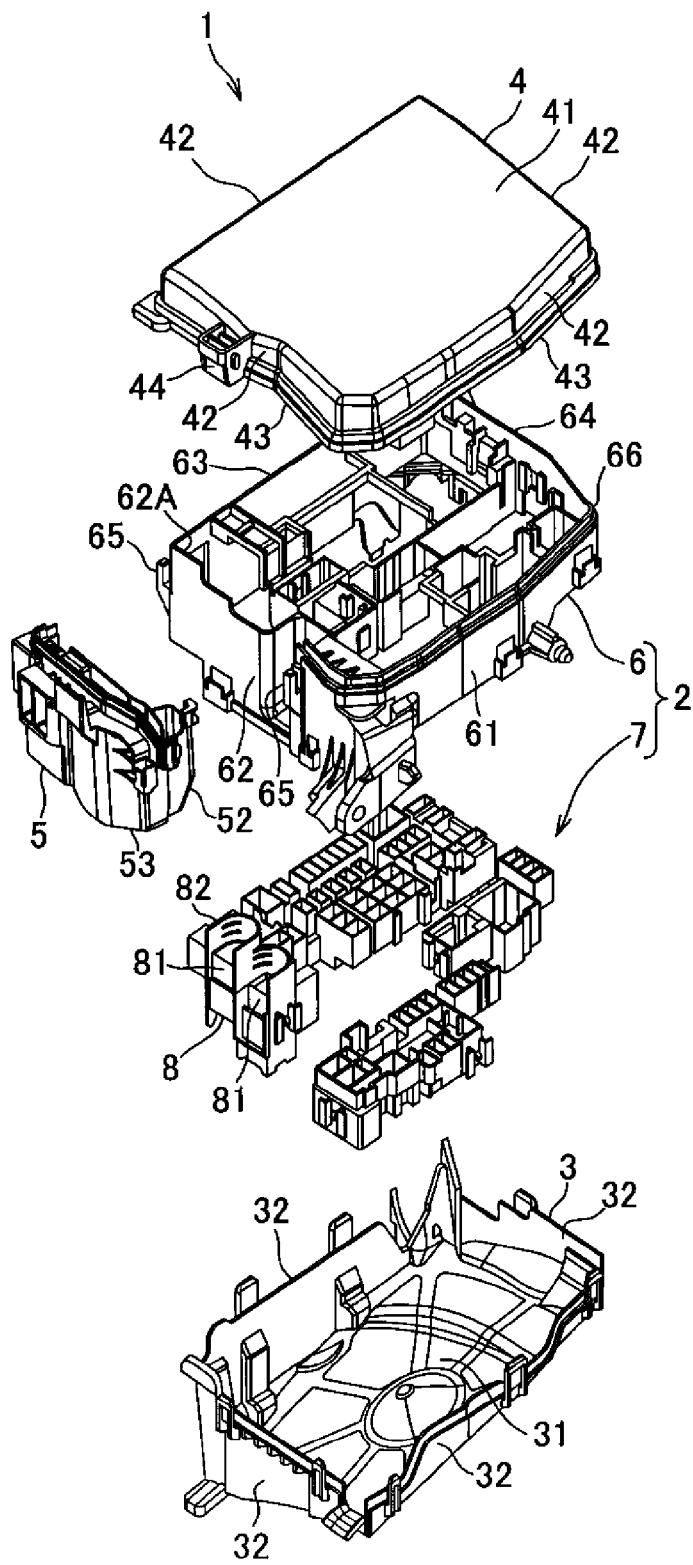
FIG. 2 is an exploded perspective view illustrating the junction box.
Figure 3:
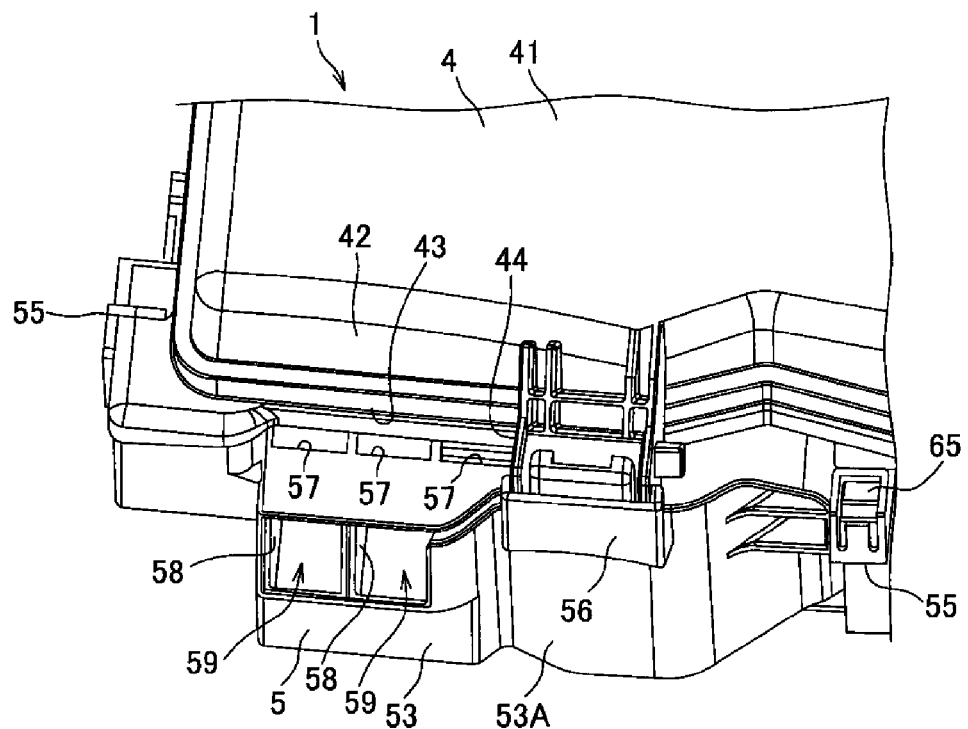
FIG. 3 is a perspective view illustrating a part of the junction box which is enlarged.

As shown in FIGS. 1 to 3, the junction box 1 includes a box body 2, a lower cover 3 which covers the lower part of the box body 2, an upper cover 4 which covers the upper part of the box body 2, and a side cover 5 which is attached onto a side face of the box body 2. The box body 2 includes a body case 6, a plurality of cassette blocks 7 as component mounting portions where a plurality of electric components and/or a plurality of bus bars are mounted, and a junction block 8 as an electric distribution portion where power source lines from external batteries or the like are connected, and the plurality of cassette blocks 7 are accommodated inside the body case 6. The lower cover 3, the upper cover 4, the body case 6 and the cassette blocks 7 are molded of insulating synthetic resin by well-known injection molding, respectively.

The body case 6 is totally formed into a pipe shape in which the inside of the body case 6 is partitioned by a plurality of partition walls, and has side wall portions 61, 62, 63 and 64 which continuously form four borders of the body case. The lower cover 3 is formed into a box shape which opens upwards by having a bottom panel 31, and vertical walls 32 which are raised from the fringes of the bottom panel 31 and are connected to the side wall portions 61, 62, 63 and 64 of the body case 6. The upper cover 4 is formed into a box shape which opens downwards by having a top panel 41, and down wall portions 42 which are hung down from the fringes of the top panel 41 and are connected to the side wall portions 61, 62, 63 and 64 of the body case 6 and the side cover 5. At the lower edges of the down wall portions 42, a water stop projecting portion 43 which is overlapped on the outsides of the side wall portions 61, 62, 63 and 64 is formed continuously in the peripheral direction. A lock portion 44 is formed at the down wall portion 42 along the side wall portion 62 in the down wall portions 42.

The cassette block 7 has a plurality of mounting parts where electric components such as a relay, a fuse or a fusible link are mounted, and an accommodating portion which accommodates bus bars and terminals with electric wires to connect the mounting parts and/or connect the mounting parts and the electric distribution portion. The junction block 8 includes two bolt blocks 81, and a case 82 which accommodates these bolt blocks 81. The bolt block 81 mechanically and electrically connects a bus bar, which is connected to an electric component of the cassette block 7, and a terminal fitting 51 (refer to FIG. 4) which is accommodated in the side cover 5 and connected to a power source line, and has a bolt which fixes the terminal fitting 51 by fastening a nut not shown in the figures.

Figure 4:
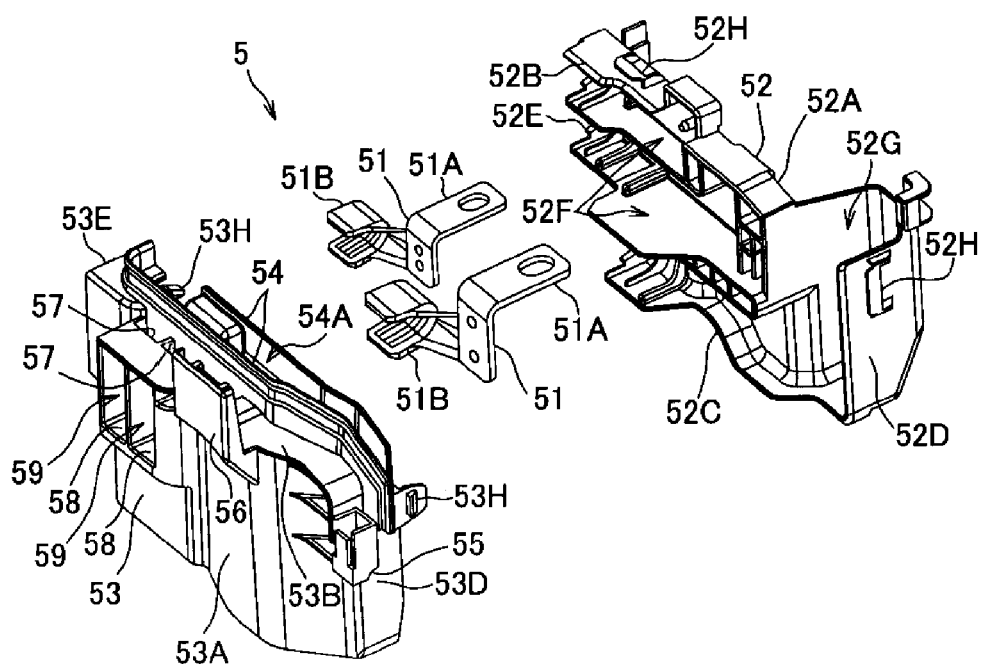
FIG. 4 is an exploded perspective view illustrating a side cover in the junction box.
Figure 5:
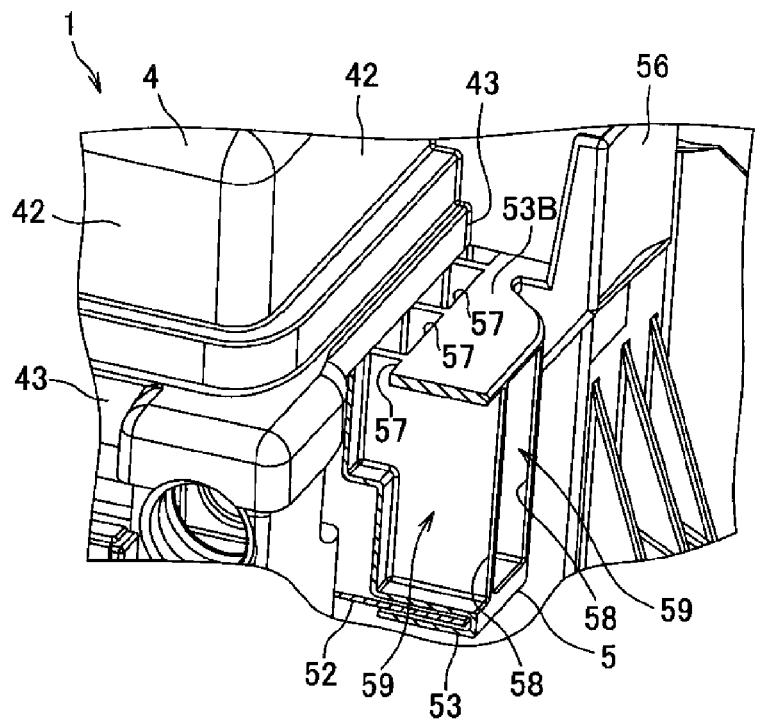
FIG. 5 is a perspective view illustrating main parts of the junction box as a part of cross section.
Figure 6:
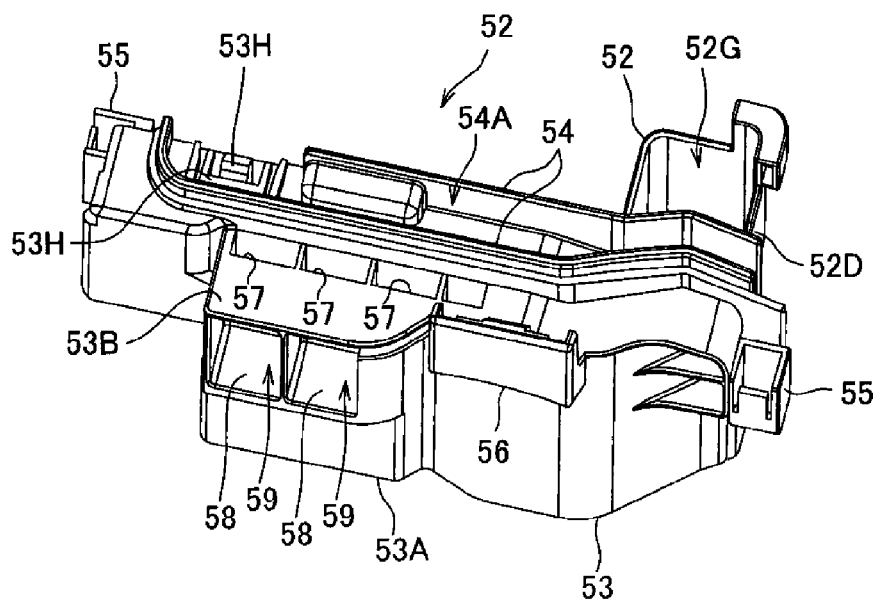
FIG. 6 is a perspective view illustrating the side cover.

As shown in FIG. 4, the side cover 5 has a pair of terminal fittings 51 to which power source lines which extend from a power supply such as a battery or an alternator are connected, and a first case 52 and a second case 53 as case portions which cover the terminal fittings 51. The terminal fitting 51 is obtained, for example, by bending a thick metal sheet, and integrally includes a flat board-formed electric contact portion 51A which has a hole into which the bolt of the junction block 8 is inserted, and an electric wire distribution portion 51B which is connected to the power source line. The electric contact portion 51A is provided to project into the side of the box body 2 from the first case 52, and the electric contact portion 51A that projects in this way is adapted to be connected to the bolt of the bolt block 81.

The first case 52 and the second case 53 are molded of insulating synthetic resin by well-known injection molding, respectively. The first case 52 is formed into a box shape which opens to the side of the second case 53 by having a first side face portion 52A of a side face shape in accordance with the side wall portion 62 of the body case 6, a first upper portion 52B which extends from the first side face portion 52A to the side of the second case 53, a first bottom face portion 52C, a first front face portion 52D and a first back face portion 52E. In the first case 52, a terminal accommodating portion 52F which accommodates the pair of terminal fittings 51, and a harness insertion portion 52G, into which a wire harness which is connected to the cassette block 7 through a connector or the like is inserted, are formed. In the first side face portion 52A, through holes into which the electric contact portions 51A of the terminal fittings 51 are inserted are formed, and in the first back face portion 52E, a semicircular-formed insertion portion into which the power source lines connected to the electric wire distribution portions 51B are inserted, and a semicircular-formed insertion portion into which the wire harness which passes through the harness insertion portion 52G is inserted are formed.

The second case 53 is formed into a box shape which opens to the side of the first case 52 by having a second side face portion 53A which forms the outer side face of the side cover 5 opposite to the side face portion 52A of the first case 52, a second upper portion 53B as a flat face portion which extends from the second side face portion 53A of the second case 53 to the side of the first case 52, a second bottom face portion (not shown in the figure), a second front face portion 53D and a second back face portion 53E. In the second back face portion 53E, semicircular-formed insertion portions into which the power source lines and the wire harness are respectively inserted are formed together with the insertion portions of the first back face portion 52E. In the second upper portion 53B, a pair of vertical walls 54 which are raised at the side opposite to the first case 52 (that is, the side opposite to the side wall portion 62 of the body case 6), are formed, and a drain groove 54A is provided between the pair of vertical walls 54. A plurality of through holes 57 as recesses or holes are formed farther outwards (the side of the second side face portion 53A) than the outer vertical wall 54, a plurality of opening portions 58 are formed on the second side face portion 53A, and the through holes 57 and the opening portions 58 are communicated by drain paths 59 formed into a hollow form inside the second side face portion 53A.

The first case 52 and the second case 53 mentioned above are totally constructed into a box shape when the first upper portion 52B and the second upper portion 53B are overlapped with each other, the first bottom face portion 52C and the second bottom face portion are overlapped with each other, the first front face portion 52D and the second front face portion 53D are overlapped with each other, and the first back face portion 52E and the second back face portion 53E abut against each other. By locking lock portions 53H formed on the inner vertical wall 54 of the second case 53 to lock receivers 52H formed on the first upper portion 52B and the first front face portion 52D, the side cover 5 is formed by attaching the first case 52 and the second case 53 to each other. By fitting cylindrical fitting portions 55 formed at the side of the second front face portion 53D and the side of the second back face portion 53E in the second case 53 into fitting projections 65 (refer to FIG. 2) of the body case 6 from above, the side cover 5 is attached to the box body 2. By engaging a lock piece 56 which is formed by extending upwards from the second side face portion 53A in the second case 53, with a lock portion 44 of the upper cover 4, the upper cover 4 is locked to the box body 2 through the side cover 5.

Next, a water stop structure for preventing water or the like from leaking into the box body 2 in the junction box 1 is described. First, when the side cover 5 is assembled to the box body 2, after the cylindrical fitting portions 55 are located above the fitting projections 65 of the body case 6, while the second upper portion 53B is pressed to drop the side cover 5, the cylindrical fitting portions 55 are fitted into the fitting projections 65. As shown in FIG. 2, in the upper edges of the side wall portions 61, 62, 63 and 64 of the body case 1, a side wall drain groove 66 is formed by a pair of opposed wall portions to the inside and outside of the body case 6. The pair of wall portions to construct the side wall drain groove 66 are formed so that the outer wall portion is lower than the inner wall portion. The side wall drain groove 66 is not formed in a range where the side cover 5 is attached in the side wall portion 62. The drain groove 54A of the side cover 5 located in the range continue the side wall drain groove 66 of the body case 6, and a part (part of the lock portion 53H) where the inner vertical wall 54 of the drain groove 54A is partly cut off can be occupied by a rising edge of the side wall portion 62. Thereby, the drain groove 54A and the side wall drain groove 66 are adapted to be formed into a groove form continuously in the peripheral direction.

When the upper cover 4 is attached by covering the upper part of the box body 2 and the side cover 5, the water stop projecting portion 43 is located to overlap the outsides of the outer vertical wall 54 of the drain groove 5A and the outer face of the side wall drain groove 66, that is, the drain groove 54A and the side wall drain groove 66 is adapted to be covered by the down wall portions 42. Therefore, when water is to enter into the junction box 1 from outside, first, the water is prevented from leaking into the box body 2 by the water stop projecting portion 43. Further, the through holes 57 formed in the second upper portion 53B of the side cover 5 are provided by extending from positions below the water stop projecting portion 43 of the upper cover 4 to positions farther outwards than the water stop projecting portion 43. Thereby, part of the water which drops on the side cover 5 enters into the through holes 57, and does not splash towards the water stop projecting portion 43 of the upper cover 4. Even if the water which drops onto the second upper portion 53B splashes, because there is a distance from the water stop projecting portion 43 to the second upper portion 53B, the water will not enter into the gap below the water stop projecting portion 43. Furthermore, the water which enters the through holes 57 is drained out from the opening portions 58 through the drain paths 59. A water stop structure of the junction box 1 is constructed as above. On the other hand, even if the water enters into the inside of the drain groove 54A and/or the side wall drain groove 66 by bypassing the lower part of the water stop projecting portion 43, this water is guided along the drain groove 54A and/or the side wall drain groove 66 to a drain hole not shown in the figures, and drained to the outside of the box body 2 from the drain hole, and may not leak into the cassette blocks 7 and/or the junction block 8 inside the box body 2.

According to the present embodiment, because water is prevented from splashing upwards by the through holes 57 formed in the second upper portion 53B of the side cover 5, water can be prevented from leaking from below towards the water stop projecting portion 43 of the upper cover 4, water can be inhibited from leaking from the gap between the side cover 5 and the upper cover 4, and water can be prevented from leaking into the junction block 8 which is an electric distribution portion. Furthermore, because the through holes 57 are communicated with the opening portions 58 by the drain paths 59, the water which enters into the through holes 57 is drained from the opening portions 58 through the drain paths 59 to the outside. Even if the second upper portion 53B which is a flat face to be pressed when the side cover 5 is attached is formed, because water can be inhibit from splashing by the through holes 57, while the mounting operativity of the side cover 5 can be improved, water stop property of the junction box 1 can be improved.

The above described embodiments are only representative embodiments of the invention, and the invention is not limited to the above embodiments. That is, various modifications can be made without departing from the spirit and scope of the invention.

For example, in the above-mentioned embodiment, the junction box 1 has the box body 2 and the lower cover 3, but the lower cover 3 may be constructed integrally with the body case 6. Furthermore, the box body 2 is not limited to be constructed separately by the body case 6, the cassette blocks 7 and the junction block 8, but all these parts may be formed integrally. In the embodiment, the through holes 57, the opening portions 58 and the drain paths 59 are formed in the second case 53 of the side cover 5, but the through holes 57 and the like may be formed in the first case 52 and the through holes 57 and the like may be formed in both of the first case 52 and the second case 53. Furthermore, the side cover 5 is not limited to include the first case 52 and the second case 53, but the terminal metal fittings 51 may be embedded in an integral case. The through holes 57 are not limited to recesses or holes, but may be bottomed cavities having an appropriate depth, or recesses that have an appropriate slope or concavity and/or convexity, and any forms may be adopted as long as water can be inhibited from splashing towards the upper face of the side cover 5.

By the present disclosure, a junction box which prevents water from leaking into the electric distribution portion located inside the box body can be obtained.

What is claimed is:

1. A junction box comprising:
a box body that has a component mounting portion for mounting an electric component;
an upper cover that covers an upper part of the box body; and
a side cover that is attached to a side face of the box body,
wherein the box body has a side wall portion which surrounds the component mounting portion and an electric distribution portion which is electrically connected to the component mounting portion;
wherein the upper cover has a top panel and a down wall portion which are downwardly provided from the peripheral end of the top panel;
wherein the side cover has a terminal connected to the electric distribution portion and a case portion which covers the terminal; and
wherein a recess or a hole which is located outside the down wall portion of the upper cover is formed on an upper face of the case portion,
wherein the side cover has an opening which opens on an outer side face portion of the case portion,
wherein the recess or hole communicates with the opening by a drain path formed into an inside surface of the case,
wherein the outer side face portion extends from the upper face of the case portion.

2. The junction box according to claim 1, wherein a water stop projecting portion which is overlapped on the outside of the side wall portion of the box body is formed on the upper cover continuously along a lower edge of the down wall portion;
wherein the side cover has a vertical wall which is raised from the upper face of the side cover, and the water stop projecting portion is provided so as to overlap the vertical wall from the outside of the vertical wall; and
wherein the recess or the hole in the side cover is provided to be farther outwards than the vertical wall.

3. The junction box according to claim 1, wherein a flat face portion located farther outward than the recess or the hole is formed on the upper face of the side cover; and
wherein the side cover has an attachment portion which is configured to attach to the box body while sliding downward from above along the side wall portion of the box body by receiving pressing power at the flat face portion.

* * * * *